(12) United States Patent
Chan (10) Patent No.: US 11,728,878 B2
(45) Date of Patent: Aug. 15, 2023

(54) SYSTEMS AND METHODS FOR LOCALLY SUPPRESSING INTERFERENCE IN RADIO FREQUENCY COMMUNICATIONS BY SATELLITES

(71) Applicant: Vit Tall LLC, Orlando, FL (US)

(72) Inventor: Steve Chan, Orlando, FL (US)

(73) Assignee: Vit Tall LLC, Orlando, FL (US)

( * ) Notice: Subject to any disclaimer, the term of this patent is extended or adjusted under 35 U.S.C. 154(b) by 170 days.

(21) Appl. No.: 17/683,934

(22) Filed: Mar. 1, 2022

(65) Prior Publication Data

US 2022/0416876 A1 Dec. 29, 2022

Related U.S. Application Data

(60) Provisional application No. 63/155,197, filed on Mar. 1, 2021.

(51) Int. Cl.
*H04W 72/23* (2023.01)
*H04B 7/08* (2006.01)
*H04B 7/155* (2006.01)
*H04B 7/0456* (2017.01)

(52) U.S. Cl.
CPC ......... *H04B 7/0857* (2013.01); *H04B 7/0456* (2013.01); *H04B 7/086* (2013.01); *H04B 7/15585* (2013.01); *H04W 72/23* (2023.01)

(58) Field of Classification Search
CPC ... H04L 5/0048; H04L 5/0007; H04L 5/0073; H04L 5/0023; H04L 1/0026; H04L 5/0035; H04L 5/0053; H04L 5/006; H04W 72/23; H04W 88/08; H04W 84/12; H04W 72/0446; H04W 72/0453; H04W 88/02; H04W 16/14; H04W 72/20; H04B 7/0617; H04B 7/0456; H04B 7/0452; H04B 7/0628; H04B 7/0695; H04B 7/088; H04B 7/0413; H04B 7/0686
USPC ....................................................... 375/262
See application file for complete search history.

(56) References Cited

U.S. PATENT DOCUMENTS

| | | | |
|---|---|---|---|
| 2009/0066574 A1* | 3/2009 | De Lorenzo | G01S 19/21 342/357.62 |
| 2011/0280295 A1* | 11/2011 | Corona | H04L 25/03993 375/224 |
| 2012/0127027 A1* | 5/2012 | Sahinoglu | G01S 13/5244 342/189 |
| 2012/0249361 A1* | 10/2012 | Sahinoglu | G01S 13/5244 342/159 |
| 2018/0054787 A1* | 2/2018 | Yanikomeroglu | H04J 11/0066 |

* cited by examiner

*Primary Examiner* — Eva Y Puente
(74) *Attorney, Agent, or Firm* — ArentFox Schiff LLP (57) ABSTRACT

The present disclosure provides methods and systems for locally suppressing interference in RF communications by satellites and related methods of using such systems. In some aspects, the interference suppression is performed by one or more small form factor satellites (e.g., CubeSats).

20 Claims, 2 Drawing Sheets

SYSTEMS AND METHODS FOR LOCALLY SUPPRESSING INTERFERENCE IN RADIO FREQUENCY COMMUNICATIONS BY SATELLITES

CROSS-REFERENCE TO RELATED APPLICATION

This application claims the benefit of priority to U.S. Provisional Patent Application No. 63/155,197, which was filed on Mar. 1, 2021, the entire contents of which is incorporated herein by reference in its entirety.

TECHNICAL FIELD

This disclosure generally relates to radio frequency (RF) communications, and more specifically to methods for locally suppressing interference in radio frequency communications by satellites.

BACKGROUND

Traditional long-range communications are achieved by using high-powered RF communications. However, the static RF footprint exposes long-range oriented communications nodes to adversarial jamming, eavesdropping, and other Advanced Persistent Threat (APT) vectors. To mitigate against this exposure, the notion of a more agile and Resilient Networked Distributed Tessellation Communications (RNDTC) has been proposed by a variety of agencies and organizations. One of the challenges, among others, is to achieve distributed beamforming without the benefit of apriori information as it pertains to the involved constituent nodes. To date, spatial diversity has been assumed and relied upon for clustering purposes. However, as information is obtained in real-time, hitherto heuristically designated single clusters may actually turn out to be comprised of multiple distinct and disparate clusters, and in some cases, the constituent clusters may even represent adversarial organizations. Given these nuances of cluster identification, the complexity of interference suppression also greatly increases.

Numerous technical calls have converged upon an overarching goal of RNDTC so as to provide long-range communications through the notion of "tessellation" antennas, which are comprised of spatially distributed low Size, Weight, Power, and Cost (SWaP-C) transceiver "polygons" (e.g., CubeSats). At its core, this approach supplants higher powered amplifiers and large directional antennas with various tessellations of spatially dispersed transceiver polygons. In essence, the transmit power is spatially distributed amongst the polygons, and gain is achieved via signal processing rather than the use of an antenna aperture to concentrate energy.

There are promising interference mitigation factor pathways, such as adaptive weight shifting, during the analyzing, transforming, and synthesizing of such signals. However, despite the advantages of adaptive weighting techniques, the computational complexity is extremely high, and the ensuing complexity reduction processes are subject to adversarial exploitation.

There thus exists a need to reduce computational complexity without relinquishing security in order to improve long-range communications.

SUMMARY OF THE DISCLOSURE

In a general aspect, the disclosure provides methods and systems for locally suppressing interference in RF communications by satellites. The present methods and systems may be implemented using a network of satellites (e.g., CubeSats). When the interference suppression signal processing is shifted to the CubeSats (i.e., computations are performed locally on a satellite), latency is greatly reduced when computations are made less complex. Using a network of satellites such as CubeSats also naturally reduces interference because an adversarial node will need to target multiple satellites to impact overall performance. Even if one CubeSat is deemed incapable of communicating properly because it is targeted by an adversarial node, the remaining CubeSats can continue communication.

In a first general aspect, the disclosure provides a method for locally suppressing interference in radio frequency communications by satellites, comprising: detecting, by a satellite, an interference signal from an adversarial source; in response to detecting the interference signal, generating, by the satellite, a null signal to suppress the interference signal by: executing adaptive beamforming to mitigate against morphological adjustments in the interference signal; determining an adaptive weight vector (AWV) by maximizing a recast signal-to-interference-plus-noise (SINR) criterion subject to a similarity constraint, wherein maximizing the recast SINR criterion is transformed into a convex optimization problem solved by a Quadratically Constrained Quadratic Programming (QCQP) step-down algorithm; determining, via Space-Time Adaptive Processing, a covariance interference matrix based on the AWV; and suppressing, by the satellite, the interference signal using the generated null signal.

In some aspects, the transformation into the convex optimization problem is performed by a Semi-Definite Programming (SDP) solver implemented on a modified GNU Octave (M-GNU-O) platform.

In some aspects, the M-GNU-O platform utilizes Compute Unified Device Architecture (CUDA) multi-threaded parallel computing accelerants to address the convex optimization problem.

In some aspects, an NP-hardness for maximizing the recast SINR is reduced from non-deterministic polynomial-time hardness (NP-hard) to polynomial time using the M-GNU-O platform.

In some aspects, the method further comprises tuning the AWV via a decomposition-based evolutionary algorithm.

In some aspects, the decomposition-based evolutionary algorithm is a steady state genetic algorithm (SSGA).

In some aspects, the SSGA is supplemented by a specific Particle Swarm Optimization (PSO) approach for hyperparameter reduction because genetic algorithms do not converge as quickly as PSO.

In some aspects, the interference signal is nonstationary.

In some aspects, the satellite further comprises magnetorquers configured to provide attitude control, detumbling, and/or stabilization of the satellite.

In some aspects, the satellite is a CubeSat.

In any of the methods or systems described herein, some or all of the plurality of satellites may comprise a CubeSat or another small form factor satellite. CubeSats are built to standard dimensions (Units or "U") of 10 cm×10 cm×10 cm. They can be, e.g., 1U, 2U, 3U, or 6U.

Additional aspects will be readily apparent to one of skill in light of the totality of the disclosure.

DETAILED DESCRIPTION

Exemplary aspects of the disclosure are described herein in the context of methods and systems for locally suppressing interference in RF communications by satellites. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the exemplary aspects as illustrated in the accompanying, drawings. The same reference indicators will be used to the extent possible throughout the drawings and the following description to refer to the same or like items.

In terms of interference suppression, the envisioned signal processing (and constituent self-forming array), as construed by many, segues into the promulgation of nulls in the direction of interference so as to effectuate a suppression/mitigation mechanism in the spirit of anti-jamming. Particularly in a battlefield environment, with various adversarial entities, the involved continual relative motion results in a constantly shifting interference direction. To further complicate matters, jamming typically involves dynamic interference source(s). Hence, the null promulgated by a spatial filtering algorithm may not be able to sufficiently suppress the interference. Given the constantly shifting arrival angle of the interference signal and the dynamism involved, computing the pertinent anti jamming vector from simply a sample covariance matrix derived from a sampled signal, for most cases, proves to be ineffectual. This is particularly pertinent in the realm of multi-domain cyber electromagnetic spectrum vulnerabilities for fifth generation (5G) technology standard for cellular networks. Consequently, mitigation factors for the realm of multi-domain RNDTC (e.g., 5G) might be apropos, particularly as several technical calls (e.g., Defense Advanced Research Projects Agency or DARPA) have converged upon an overarching goal of RNDTC so as to provide long-range communications through the notion of tessellation antennas, which are comprised of spatially distributed low Size, Weight, Power, and Cost (SWaP-C) transceiver polygons (used interchangeably with term "satellites").

Figure 1:
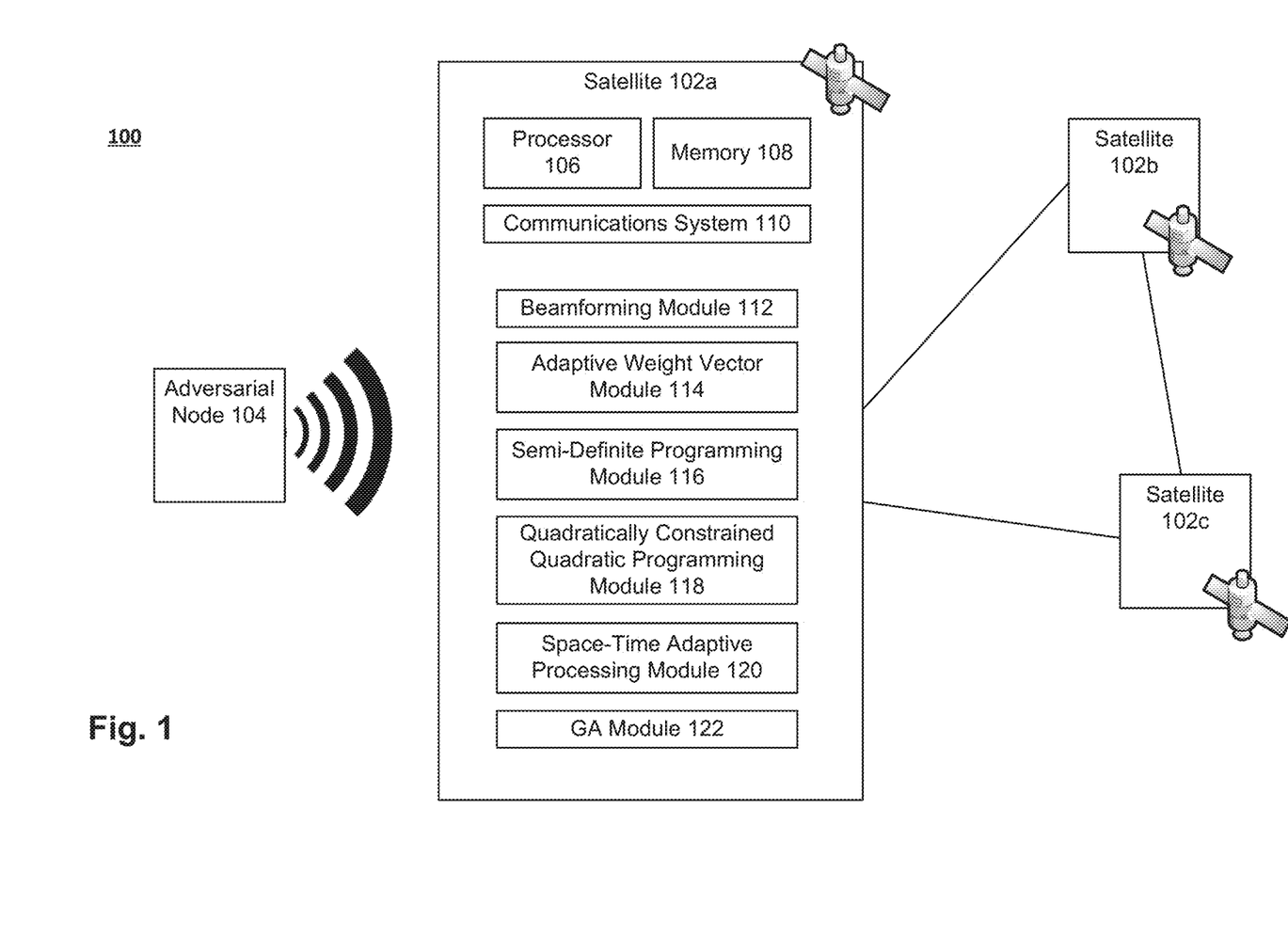
FIG. 1 is a diagram of an inventive system for locally suppressing interference in RF communications by satellites.

FIG. 1 is a diagram of inventive system 100 for locally suppressing interference in RF communications by satellites. On a base level, the methods and systems described herein may be executed by a plurality of satellites 102 (e.g., 102a, 102b, 102c), wherein each satellite comprises at least one clock device (e.g., a cesium oscillator) and a communications system configured to allow each satellite to communicate with one or more of the remaining plurality of satellites. For simplicity, the hardware and software components are only shown in satellite 102a, but one skilled in the art will appreciate that these components may also be found in satellites 102b and 102c. Furthermore, only three satellites are shown for simplicity, but more or less satellites may be included in system 100. Each satellite 102 comprises processor 106, memory 108, and communications system 110. Using communications system 110, a mesh network can be created whereby the individual satellites can communicate with each other to manage and/or synchronize their clock devices. This configuration is advantageous because it provides a resilient network that can detect and compensate for attacks by an adversarial source (e.g., adversarial node 104) and isolated technical failures. For example, the synchronization methods described herein may be used to detect that the clock device integrated into a given satellite within the network is producing anomalous readings compared to the majority of other clock devices integrated into the plurality of satellites.

In some aspects, the plurality of satellites may be configured to engage in individual or collaborative swarm reconfiguration and movement planning. For example, one or more of the satellites in the plurality of satellites forming the network may comprise onboard magnetorquers which allow the respective satellite(s) to shift from a low-drag to a high-drag state. The configuration of the swarm may be adjusted for a variety of reasons. For example, a satellite may be moved into a new position to provide a stronger signal in a given area or to replace a satellite that has failed due to a hardware failure or damage (e.g., caused by debris or an anti-satellite directed energy weapon). Members of the swarm may also be repositioned, in some instances, for defensive reasons. For example, a satellite may be used to block debris.

The signal processing performed in the present disclosure is made effective when the NP-hardness for signal-to-interference-plus-noise ratio (SINR) computations is brought from non-deterministic polynomial-time hardness (NP-hard) to polynomial time. In a high-level overview, this is accomplished using the following signal processing tasks: (1) Advance, via beamforming module 112, an adaptive beamforming algorithm that will enhance the beamforming and endeavor to mitigate against interference morphological adjustments, (2) Advance, via adaptive weight vector module 114, a hybridized Adaptive Weight Vector (AWV) algorithm conjoined with a decomposition-based evolutionary algorithm (a.k.a., Genetic Algorithm or GA executed by GA module 122), which are both supported by an Artificial Intelligence (AI)-based prioritization algorithm for selective continual updating of the AWV, (3) Advance, via semi-definite programming module 116, a Semi-Definite Programming (SDP) algorithm, which can transform the AWV derivation, via maximizing a recast SINR criterion subject to a similarity constraint, that can be recast as a convex optimization problem, (4) Advance, via Quadratically Constrained Quadratic Programming Module 118, a Quadratically Constrained Quadratic Programming (QCQP) step-down algorithm, which will compute the QCQP special class convex optimization problem in polynomial time, (5) Advance, via space-time adaptive processing module 120, multi-dimensional Space-Time Adaptive Processing (STAP) algorithmic solution set, an enhancement of the maximized SINR, and (6) Advance a structural exploitation of the covariance interference matrix so as to leverage SDP Solvers and ascertain optimal preprocessors.

The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor (e.g., processor 106) of a computer system (e.g., satellite 102a, 102b, 102c, etc.). Accordingly, each module may be realized in a variety of suitable configurations, and should not be limited to any particular implementation exemplified herein.

In exemplary aspects, beamforming module 112 executes the adaptive beamforming algorithm. The first priority of an adaptive beamforming algorithm is signal extraction while concurrently suppressing interference as well as noise. The differentiation between the involved methodological approach, as contrasted to conventional approaches (which often experience non-graceful performance degradation) is that of hybridizing, via a prioritization engine, signal-subspace projection (eigenspace-based beamformers, via orthogonal projection of signal subspace, can reduce a substantive portion of noise), diagonal loading (incongruity between the posited and actual array response can be mitigated, via automatic computations), and other methodological approaches to reduce noise, interference, and performance degradation. Collectively, these methods will be selected (based upon the time involved) to enhance the beamforming and endeavor to mitigate against interference morphological adjustments (e.g., propagation channel varying, interference dynamism, etc.).

In exemplary aspects, AWV module 114 determines the adaptive weight vector. The computational availability of Field Programmable Gate Arrays (FPGAs) can facilitate the selective updating of the optimal adaptive weight vector (AWV). Concurrently, derivative null broadening algorithms (the imposition of nulls toward the regions of the nonstationary interference, predicated upon the reconstruction of the interference-plus-noise covariance matrix) offset the need for continuous updating and can move the paradigm towards selective updating. In essence, the AWV can be derived, via maximizing a recast SINR criterion subject to a similarity constraint. On a parallel pathway, the AWV can be validated, and more finely-tuned, via a decomposition-based evolutionary algorithm coupled with AWV, for normalized as well as scaled cases, amidst a multi-faceted non-permissive environs.

In exemplary aspects, SDP module 116 executes an SDP solver. Here, the described pathways converge for a constrained paradigm, which can be transformed into a convex optimization problem, via SDP solvers. In some aspects, the SDP solvers utilized by SDP module 116 are implemented on a Modified GNU Octave platform that takes advantage of Compute Unified Device Architecture (CUDA) multi-threaded parallel computing accelerants for the involved SDP solvers to quickly address the various involved convex optimization problems described herein; signal processing and fuzzy logic packages are obtained, via Octave Forge, for use on the Modified GNU Octave platform. This makes local computations at a satellite such as a CubeSat possible. Once in the convex form, which constitutes a special class, the computational complexity of the involved QCQP can be reduced from non-deterministic Polynomial-time Hardness (NP-hard) to the desired optimality in polynomial time. QCQP module 118 executes a QCQP step-down algorithm that computes the QCQP special class convex optimization problem in polynomial time.

The modified GNU Octave (M-GNU-O) platform further increases computational speeds relative to other platforms such as MATLAB™. On this customized high performance, multi-threaded platform, certain insights can be quickly gleaned when testing various algorithms with regards to spatial multiplexing. For example, as transceiver polygons are removed, thereby simulating various scenarios (e.g., destroyed transceiver polygons), the array is re-formed and optimal reconfigurations are re-computed in quasi-real time; if the utilized algorithm and platform exhibit suboptimal performance, the associated processes may be too immature for subsequent implementation onto a programmable System-on-Chip (SoC) paradigm. Thus, in exemplary aspects, the systems and methods employ the M-GNU-O.

The application of STAP module 120 enhances performance of the posited Resilient Networked Distributed Tessellation Communications (RNDTC) application paradigm, via identification of diversity paths, so as to mitigate against the multipath interference phenomenon as well as more intrusive interference measures. The determination of the diversity paths are formulated via certain elastic functions. Furthermore, the diversity paths are validated by an A.I. prioritization engine onboard the satellite. A key factor to a robust STAP interference suppression paradigm, in addition to an advanced SDR emulation environment platform, resides in the determination of the covariance interference matrix. It is generally accepted that the optimal STAP filter is often designed based upon being able to discern the known covariance matrix and the known Doppler angle. The principal challenge of STAP is resolving and inverting the unknown interference covariance matrix.

In the present disclosure, partially adaptive STAP approaches are be employed, which assume that the dominant interferences are constrained to a low-dimensional subspace; various Dimensionality Reduction (DR) STAP algorithms are available, and they are typically classified by the type of pre-processor utilized. For example, beamforming algorithms typically leverage spatial pre-processing, whereas post-doppler algorithms might leverage temporal Doppler pre-processing.

In yet other scenarios, the inherent structure of the clutter can be exploited to design preprocessors, which could feasibly yield the optimal minimal acceptable rank (i.e., Rank Minimization Problem or RMP) of the clutter covariance matrix. Here, the rank of the clutter covariance matrix provides insight into the expanse of the clutter paradigm as well as indicates the number of Degrees-of-Freedom (DoF) needed to achieve an effective clutter cancellation. In many cases, the involved dimensionality reduction is achieved, via various matrix rank reduction methods (wherein the approximating matrix, the optimization variable, has reduced rank compared to the given matrix, the sourced data), and the resultant lower rank matrix decomposition-based solution necessitates twice the secondary measurements as that of the rank of the clutter covariance matrix so as to achieve optimal STAP performance.

It should be noted that in terms of STAP, the heuristic (i.e., lower covariance value→higher confidence in the detection result at time t; higher covariance value→higher confidence in the detection result at time t−1) constitutes a configuration parameter, which can be exploited, particularly when time-sensitive real-time detection systems are central to the system.

The optimal filter is construed to be unique member among an infinite set of filters. The configuration parameter or parameter tuning of the optimal filter, even after it is ascertained, can be manipulated. Prototypical deep convolutional generative adversarial networks (DCGANs) exhibit non-graceful degradation of performance even at imperceptible perturbation levels, which results in numerical instability. Even imperceptible (possibly adversarial) perturbations to the input set can cause degradation of the DCGAN performance. More granularly, the discriminator of the generative adversarial neural network is highly vulnerable to adversarial perturbation (the gradient produced by the discriminator will contain non-informative adversarial noises), thereby leading to training instability. This paradigm can be referred to as the "input [uncertainty] set," as the input set may contain certain adversarial perturbations/manipulations (thereby inducing uncertainty, amidst the potential training instability).

Tuning typically employs two approaches: Statistical Consistency Tests (SCT) and True Covariance Analysis (TCA). However, in the present disclosure, A.I.—centric automated tuning approaches are utilized. In some aspects, the A.I. centric automated tuning approach is a Genetic Algorithm (GA), which is an optimization algorithm executed by GA module 122. GAs tend to be quite efficient when a large search space is involved, the involved optimization computation can readily be parallelized, and they are of zero order (i.e., independent of the prior). GAs treat each parameter set, within the parameter space, individually.

In some aspects, the approach utilized is that of a GA subset entitled "SteadyState GA" (SSGA), wherein: (1) if two filters are inconsistent, their fitness value is negative, and the closer one to zero is more optimal; (2) if only one filter is consistent, the fitness value is positive, and it is construed as more optimal than the other inconsistent filter with the negative fitness value; and (3) if both filters are consistent, the more optimal filter is that with the smaller fitness value. Consequently, this re-evaluation of the involved filter performance enhances the reliability of the paradigm, via the removal of filters that do not consistently perform well.

In essence, the SSGA can be construed as a discrete-time dynamic system non-generational model implemented by GA module 122. The value-added proposition for the experimental mitigation factor for the STAP vulnerability of RNDTC is a compression factor $\zeta$ that, in some instances, serves to squeeze the steady-state population towards an accelerated convergence. A larger compression factor $\zeta$ is indicative of a compressed convergence and corresponds to a higher magnitude jump size for the fittest proportion from one generation to the successor generator; conversely, a smaller compression factor $\zeta$ is indicative of an elongated convergence and corresponds to a lower magnitude jump size. To avoid issues of local minima (e.g., random noise), dynamically tuning the compression factor $\zeta$ may provide an invaluable methodology to adjust convergence, thereby resulting in a tunable parameter that obviates the problem of premature convergence and non-optimality. In summary, the SSGA approach can indeed effectuate auto-parameter tuning so as to minimize the window for exploitation as pertains to the identified STAP heuristical vulnerability exploitation. In addition, the SSGA will be hybridized/supplemented by a specific Particle Swarm Optimization (PSO) approach for hyperparameter reduction/tuning because genetic algorithms do not converge as quickly as PSO. It should be noted that numerous numerical algorithmic implementers reserve the word discontinuous for those points where the function is defined. Hence, for a point that is not in the domain, the function is both "non-continuous" and "not discontinuous."

As hyperparameter optimization involves the fine-tuning of model parameters (e.g., underlying non-continuous functions, which would equate to discontinuous functions for this case) rather than a point-set (characterized by the term, discrete), the distinction should be made, as many MATLAB™ functions (e.g., polynomial interpolation) perform poorly across discontinuities/non-continuities.

The novelty centers upon the implementation of the PSO. Typically, the numerical algorithmic challenge of implementing a PSO on a DCGAN centers upon the conversion of non-continuous hyperparameters to discrete values, which may result in premature stagnation of particles at local optima. The involved implementation mechanics, such as increasing the inertial weighting (so as assist in mitigating the stagnation issue), may spawn yet other convex optimization problems. To mitigate against this issue, in some aspects, the present disclosure may utilize a Robust Convex Relaxation (RCR) framework, which capitalizes upon the feed-forward structure of the utilized You Only Look Once (YOLO)-based DCGAN, specifically a Deep Convolutional YOLO-Generative Adversarial Network (DC-YOLO-GAN), to improve the bound tightening for each successive neural network layer and better facilitate the global optimization, via a specific numerical stability implementation within the DC-YOLO-GAN.

To date, stochastic search approaches (problem-agnostic algorithms for solving problems, within the considered search space, which may utilize bespoke modules tailored to the considered problem and/or are combined with problem-specific algorithms) have been found to be promising. Most of the referenced algorithms reside within the swarm intelligence subfield of Artificial Intelligence. These include, among others, the previously discussed Genetic Algorithm (GA) approach and PSO algorithms (as well as differential evolution, colony optimization, etc.). These algorithms share the commonality that search entities are created, which engage in individualistic hyper-locale optimization actions while contemporaneously liaising with each other to derive a globally optimized solution. The initial challenge of these algorithms resides in the fact that if the swarm size chosen is too small, the algorithm will more likely gravitate to a local minimum without ascertaining a globally optimal solution; alternatively, if the swarm size chosen is too large, the likelihood of ascertaining a viable globally optimal solution increases, but the computational overhead increases as well.

As the methods encompassing genetic and evolutionary algorithms are not actually able to prove optimality of the solution, the PSO, a meta-heuristic algorithm (i.e., no guarantee that a globally optimal solution can be found for some classes of problems) that applies the dual approach of global exploration and local search methods to ascertain an optimum solution, is favored. It should be noted that even relatively small swarm sizes are fairly consistent in providing "good enough" close-to-optimum solutions in relatively few iterations; hence, PSO is often utilized to address Mixed-Integer Linear Programming (MILP) and Mixed-Integer Nonlinear Programming (MINLP). In both cases, the involved mathematical optimization problems have two types of variables: variables taking values in an integer domain, and variables taking values in a continuous domain.

Fundamentally, a PSO approach simulates a set of particles or candidate solutions that traverse the search space. The method for PSO initializes the swarm at a random point within the space, and each particle has an assigned position x and a velocity v. The objective function is evaluated for each particle, and a global optimum G is ascertained. Iteratively, the position x and velocity v for each particle are progressing towards its individual best, represented by the vector I, as well as the global best, represented by the vector G, as shown in Equations 1 and 2, respectively, $$x_i^{k+1} = x_i^k + v_i^{k+1} \tag{1}$$

$$v_i^{k+1} = I^k v_i^k + \alpha_1 [\beta_{1,i}(\overline{\omega}_i - x_i^k)] + \alpha_2 [\beta_{2,i}(G - x_i^k)] \tag{2}$$

where $x_i^k$ denotes the current position, and $v_i^k$ denotes the velocity of particle i at generation [time step] K with particle inertia $I^k$, which induces a certain momentum with regards to the involved particles; the parameters $\beta_{1,i}$ and $\beta_{2,i}$ are uniformly distributed random values [0,1], $\alpha_1$ and $\alpha_2$ are acceleration constants, $I_i$ denotes particle i's optimum, and (1) and (2) denote the global optimum.

An initial challenge arises with regards to the PSO to DC-YOLO-GAN implementation, as it should be noted that most of the hyperparameters are non-continuous and will devolve to discrete values (e.g., integers). However, as the position $x_i^k$ of a particle represents a set of hyperparameters, the rounding of the calculated particle velocities $v_i^k$ to discrete integer values creates an artificial environs, wherein particles may stagnate prematurely (i.e., trapped into local optima) with a non-graceful degradation of particle inertia $I^k$. Certain techniques, such as increasing the inertia (e.g., weighting the distance from the particle's local optimum) allow the involved particles to progress past their current local optimum instead of stagnating prematurely; these techniques beget calculating varying inertial weights, and the chosen platform for the experimentation herein has been a Modified GNU Octave platform. As a numerical computation platform, it is mostly compatible with comparable platforms, such as MATLAB™; however, as GNU Octave is released under a GNU GPLv3 license, the source code is modified resulting in a Modified GNU Octave (M-GNU-O) platform that can better leverage certain accelerants for use with contending with the PSO adaptive inertial weighting issue (as yet another convex optimization problem), as well as the various convex relaxations discussed herein.

The hybridizing of local and global optimization algorithms has become an accepted approach vector for deriving valid bounds for near-optimal convex optimization solutions. This can also be operationalized by denoting and resolving gradations of mixed-integer convex relaxations. Accordingly, the non-linearities are typically replaced by convex underestimators and concave overestimators (the tightest convex underestimator and the tightest concave overestimator are referred to as the convex envelope and the concave envelope of a function, respectively). Prior experimental findings indicate that RCR, which facilitates convex optimization-based methods, can be well addressed by a Modified Squeezed YOLO v3 Implementation (MSY3I) in conjunction with convex relaxation adversarial training.

Darknet (often described as an open-source neural network written in C and CUDA) is the CNN framework for the widely utilized YOLO. YOLO v2 utilizes a variant of Darknet-19, which starts with a 19-layer network supplemented with 11 additional layers, thereby yielding a 30-layer underlying convolutional architecture for YOLO v2. As well documented in the literature, the performance of YOLO v2 is sub-optimal for the need described herein; hence, a variant of YOLO v3 may be instantiated. YOLO v3 utilizes a variant of Darknet-53, which starts with a 53-layer network supplemented with 53 additional layers, thereby yielding a 106-layer underlying convolutional architecture for YOLO v3. The classification performance of YOLO v3, as contrasted to YOLO v2, is greatly enhanced, but prior experimental findings noted that the computational performance was slower. This should be axiomatic, as a search space approach for a 106-layer YOLO network, even with the constraining decision of only optimizing the number of neurons in the layers at ten test values each, would still necessitate the training of $10^{106}$ models. Hence, to decrease the number of parameters for the YOLO instantiation, the use of fire layers (of SqueezeNet) to optimize the network structure segues to a MSY3I. In essence, not only did the utilized fire layers supplant certain convolutional layers, but also the number of filters of the compression portion of the fire layers were reduced. It should therefore be of no surprise that prior research into this subject matter has indicated that the number of model parameters in MSY3I will be lower than that of YOLO with only the slightest degradation in performance.

The precision degradation point previously discussed must also be accompanied by the treatment of the issue of accuracy degradation. Along this vein, the gauging of the DC-YOLO-GAN (and deep neural networks, in general) must be examined for robustness, and this often relates to the performance of the optimal layer-wise convex relaxations implemented within the involved DCGAN or DC-YOLO-GAN. In essence, a convex relaxation is posited for ascertaining an upper bound for a worst-case instability scenario. This is of extreme value-added proposition, as prototypical DCGANs exhibit non-graceful degradation of performance even at imperceptible perturbation levels, which results in numerical instability. Given the abundance of perturbations/variability in contemporary environs, the prototypical approach of batch normalization (a.k.a. batchnorm), which is a method of inducing stability into a neural network via normalization of the input layer such that each layer can progress with its own DL independently of the DL progress of other layers, if not implemented in a particular fashion, can have counterproductive consequences. For example, applying batchnorm to all the layers of the neural network can result in oscillation and instability. Prior research has shown that this instability can be avoided by applying batchnorm, such as to a discriminator input layer, and training the discriminator separately.

To verify the performance of the layer-wise convex relaxations implemented aboard the DC-YOLO-GAN, a hybridized approach vector is utilized: (1) exact (complete), and (2) relaxed (incomplete). Prototypical exact verifiers are predicated upon Mixed Integer Programming (MIP) (specifically, MINLP, for the experimentation discussed herein), Branch-and-Bound (BnB), or Satisfiability Modulo Theories (SMT) (which, by definition, are not beset by false positives or false negatives). The challenge of utilizing exact verifiers is that they must contend with resolving NP-hard optimization problems, which in turn, obviates their scalability. Prototypical relaxed verifiers are predicated upon Mixed-Integer Convex Programming (MICP) or MILP; although MILP/MICP can be resolved expeditiously and are more scalable, the efficacy (i.e., increased false negative rates) can degrade very suddenly and quickly, thereby potentially obviating the ability to verify robustness. Hence, it can be seen that there are two aspects of relaxation: (1) the convex relaxations implemented at each layer of the MSY3I, and (2) the relaxation schema verifier implemented to ascertain robustness of the MSY3I both layer-wise and overall. These are the key elements of the RCR framework, which has a counterpoised objective of the tightest possible relaxation.

Ultimately, the final rendition of the MSY3I is dictated by the PSO deployment; the PSO ascertains the reduction in the number of hyperparameters for the MSY3I. In turn, the M-GNU-O facilitates the adaptive inertia weighting to facilitate more robust PSO performance by addressing the premature particle velocity stagnation issue.

To the extent that RCR is a key enabler for the desired PSO implementation on a DCGAN for hyperparameter reduction/tuning, etc., then the underlying enablers for RCR become central. Moreover, while certain mathematical approaches hold great promise, the implementation and computational facilitation thereof present a barrier, via the numerical algorithmic implementation challenges. The RCR architectural stack presented herein faced three successive challenges: (1) effectuating a RCR paradigm, via the bespoke MSY3I, (2) reducing the computational costs via the MSY3I paradigm, as tuned by PSO, and (3) utilizing adaptive inertial weighting, via M-GNU-0, to operationalize the PSO. The M-GNU-O served as a key enabler for facilitating (3), which in turn facilitated (2), and in turn enabled the bespoke MSY3I to effectuate a RCR paradigm, as referenced in (1). Hence, the numerical algorithmic implementation approach, utilized to operationalize the successive steps, is central, and the numerical stability implementation aspect is a lynchpin.

It had been previously noted that the initial posits regarding swarm size (i.e., part of the initialization schema) were important; the initialization schema determines how robustly and quickly the involved optimization algorithm converges upon a viable globally optimal solution. Furthermore, a nonoptimal initialization schema can segue to unstable gradients, which may have a profound impact on the stability of the involved optimization algorithms. For example, parameter updates that are excessively large (i.e., exploding gradient) or excessively small (i.e., vanishing gradient) may obviate the intended MSY3I deep learning.

Along this vein of the intended MSY3I deep learning, the choice of the YOLO version to be utilized was non-trivial. The reviews of YOLO (e.g., v4 or v5) and even other variants thereof (e.g., PP-YOLO) are still forthcoming, and peer-reviewed publications are not yet available for all the various newer versions (e.g., peer-reviewed publications are indeed available for v4, but they are not yet available for v5). The selection criteria narrowed to the version that could interoperate with the more robust set of 5G/BFG/6G-related tools. Given the performances disadvantages of YOLO v1 and v2, those were ruled out. YOLO v4 is a Darknet implementation, and YOLO v3 and v5 are PyTorch implementations; as the PyTorch library has a repertoire of 5G/BFG/6G-related tools, the choice was narrowed to YOLO v3 and v5. As YOLO v5 is not yet peer-reviewed, the decision was made to proceed with YOLO v3.

With regards to the PyTorch release version to utilize, certain functions, while stable in v0.4.1, may intrinsically contain stability issues as of v1.0.0, and some of these were only resolved as of 2020 (e.g., Update the div formula for numerical stability #43627, as higher order gradients were returning Not a Number or NaN quite often) or 2019 (e.g., Fix #11752: correct numerical issue with log_softmax #11866, as large inputs with small differences were producing numerical issues in the log_softmax). There are also other issues (e.g., nn.CrossEntropyLoss( ) yields wrong output for big logits #11752, as larger logits, which operate on the unscaled output of prior layers, were returning incorrect results) which are yet to be fully examined. By way of background information, Facebook operates two well-known open-source machine learning frameworks/toolkits: PyTorch and Convolutional Architecture for Fast Feature Embedding (Caffe2); in March 2018, the Caffe2 repository was merged into the PyTorch repository on Github. Maintainers, core-developers, and users noted that there may be incompatible elements. Clearly, the onus is on the involved 5G/BFG/6G researcher/programmer to understand the intricacies of the numerical algorithm implementation being utilized and contend with the challenge; for this case, the numerical stability implementation challenge is nearly on par with the devising of the numerical stability strategy itself.

For the experiments described herein, the approach is to utilize a family of architectures: two different RCR Paradigms (RCR Paradigm #1, RCR Paradigm #2) with different versioning of components at the MSY3I level (MSY3I #1 and MSY3I #2) as well as a Tensorflow-based DCGAN implementation, which is considered stable. MSY3I #1 is utilized as the key solver for QoS Convex optimization problems, and as such, requires a high degree of numerical stability; accordingly, PyTorch v0.4.1 was utilized. MSY3I #2 is utilized as the key solver for 5G/BFG/6G-related functions (e.g., STFT), and PyTorch v1.7.0 is utilized (v1.7.1 was only released on 10 Dec. 2020); as MSY3I #2 is intended to have a lower utilization rate, it was architected to focus upon its intrinsic stability training, so as to mitigate against the numerical instability issues from the higher PyTorch v1.7.0 (as contrasted to v0.4.1). Prior research has shown that training of feature embeddings (e.g., such as within MSY3I #2) with hard positives (specifically sampled for their contextual value) (e.g., such as derived from MSY3I #1) is a viable strategy for mitigating against the numerical instability (i.e., enhanced numerical stability) derived from naturalistic perturbations and assists with enhancing the shift-invariance (wherein a shift in the independent variable of the input causes a corresponding shift in the output). The forward stable (i.e., a forward stable DCGAN does not amplify perturbations of the input set due to, by way of example, noise) Tensorflow-based DCGAN implementation (hereinafter, DCGAN #3) was utilized to assist in mitigating against mode failure (a.k.a. mode collapse) (i.e., when two competing neural networks undergoing concurrent training fail to converge or have an unusual convergence), via the availability of an additional generator. The experimental testbed with the described components is delineated in FIG. 2 below. Moreover, an additional DCGAN will be added to derive amalgam formulations (i.e., key combinatorials) for computations. The need for this is axiomatic; mathematical equivalence does not necessarily segue to correct results when using certain versions of numerical computation libraries (e.g., PyTorch). In many cases, sub-operations should be combined, as performing the sub-operations separately would be computationally slower and more numerically unstable (e.g., as the softmax output approaches 0, the log output approaches infinity, which causes instability).

In some aspects, the requisite adaptive inertial weighting (to facilitate the PSO, which in turn would facilitate the MSY3I to process yet other convex optimizations) is itself a convex optimization problem. Many of the intermediate enabling steps involved Quadratic Programming (QP) stepdown algorithms (e.g., Quadratically Constrained for some cases, hence, Quadratically Constrained Quadratic Programming or QCQP), which would compute the QCQP special class convex optimization problem in polynomial time. A QCQP takes the form as shown in Equation 3.

$$\text{minimize } \left(\frac{1}{2}\right)x^T P_0 x + q_0^T x + r_0$$

$$\text{subject to } \left(\frac{1}{2}\right)x^T P_i x + q_i^T x + r_i \le 0, i = 1, \ldots, m$$

$$Ax = b$$

where $P_0, \ldots, P_m$ are n-by-n matrices; $P_i \in S_+^n$ and $x \in S^n$ is the optimization variable (3)

Accordingly, there are two envelopes for this aspect of discerning a gradation among convex optimization problems: (1) if $P_1, \ldots, P_m \in S_{++}^n$, where $S_{++}^n$ denotes the set of positive semidefinite matrices, the involved problem is convex, and (2) a QP with a semi-definite Hessian is still convex.

Generally speaking, the resolving of the Hessian matrix for large-scale problems is computationally impractical. However, given a particular Hessian matrix in a resolvable form, proxies (i.e., approximations) of the Hessian matrix can be generated to be resolved in alternative ways (e.g., Broyden-Fletcher-Goldfarb-Shanno or BFGS algorithm). However, to avoid false curvature information, additional initialization conditions are required; to accommodate this, resolving of the QCQP can assist in the determination of the involved trust-regions (the subset of the objective function region that is approximated). Furthermore, there are a variety of trust-region methods given a sufficiently low rank positive semidefinite matrix; in essence, this equates to computing $\hat{R}_j = \hat{R}_c + \hat{R}_n$, where $\hat{R}_c$ and $\hat{R}_n$ are examined, via resolving the following Rank Minimization Problem (RMP), as shown in Equation 4.

$$(\hat{R}_c, \hat{R}_n) = \arg\min_{R_c, R_n} \text{rank}(\hat{R}_c), \quad (4)$$

$$\text{subject to } \begin{cases} R_c + R_n = R_s \\ R_c \geq 0 \\ R_n \text{ diagonal} \end{cases}$$

In many instances, even when the input uncertainty set is designed/architected to be convex, the resultant output set may still segue to being nonconvex. Accordingly, when the rank function is nonconvex and discontinuous, the RMP cannot be solved directly. To accommodate this, and to transform the problem to convex form, the rank function is replaced with the trace function and resolved by treatment as a Trace Minimization Problem (TMP), as shown in Equation 5.

$$(\hat{R}_c, \hat{R}_n) = \arg\min_{R_c, R_n} tr(\hat{R}_c), \quad (5)$$

$$\text{subject to } \begin{cases} R_c + R_n = R_s \\ R_c \geq 0 \\ R_n \text{ diagonal} \end{cases}$$

Since the rank function tallies the number of nonzero eigenvalues, and the trace function computes the sum of the involved eigenvalues, the equation can be reconstrued as an equivalent Semi-Definite Programming (SDP) problem, as shown in Equation 6.

$$(\hat{R}_c, \hat{R}_n) = \arg\min_{R_c, R_n} tr(\hat{R}_c), \quad (6)$$

$$\text{subject to } \begin{cases} \begin{bmatrix} W_1 & R_c \\ R_C^H & W_2 \end{bmatrix} \\ R_c + R_n = R_s \\ R_c \geq 0 \\ R_n \text{ diagonal} \end{cases}$$

Once in this form (i.e., in essence, the nonconvex QCQP was relaxed to a convex SDP), there are numerous SDP solvers (e.g., SDPT3, which is a MATLAB™/GNU Octave Semi-Definite Programming or SDP software package) available for these types of problems, and as previously discussed, the M-GNU-O platform has readily supported various high-performance SDP solvers.

Figure 2:
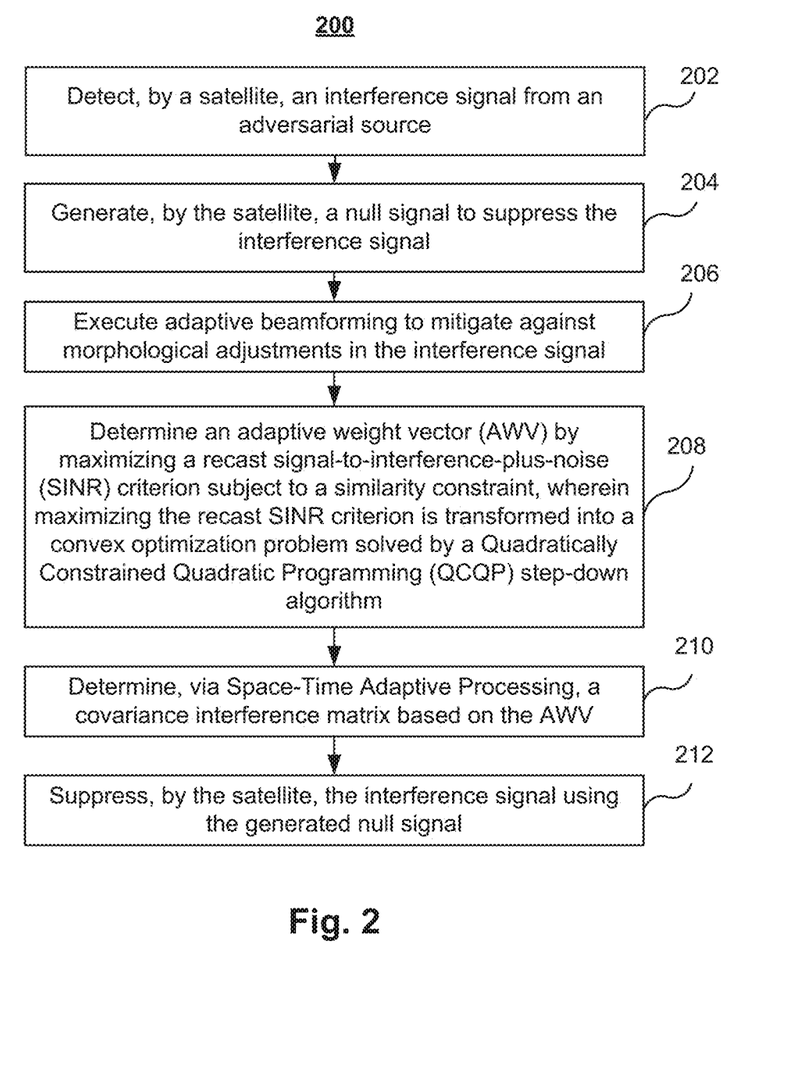
FIG. 2 is a flowchart showing an exemplary method for locally suppressing interference in RF communications by satellites.

FIG. 2 is a flowchart showing exemplary method 200 for locally suppressing interference in RF communications by satellites. At 202, satellite 102a detects an interference signal from an adversarial source (e.g., adversarial node 104). At 204, in response to detecting the interference signal, satellite 102a generates a null signal to suppress the interference signal. This is performed by the following steps. At 206, satellite 102a executes adaptive beamforming to mitigate against morphological adjustments in the interference signal. At 208, satellite 102a determines an adaptive weight vector (AWV) by maximizing a recast signal-to-interference-plus-noise (SINR) criterion subject to a similarity constraint, wherein maximizing the recast SINR criterion is transformed into a convex optimization problem solved by a Quadratically Constrained Quadratic Programming (QCQP) step-down algorithm. At 210, satellite 102a determines, via Space-Time Adaptive Processing, a covariance interference matrix based on the AWV. Once the null signal is generated, at 212, satellite 102a suppresses the interference signal using the generated null signal.

Further descriptions relating to certain embodiments may be found in the inventor's work, Chan S. (2020), "Mitigation Factors for Multi-domain Resilient Networked Distributed Tessellation Communications," The Fifth International Conference on Cyber-Technologies and Cyber-Systems (CYBER 2020), p. 66-73, 2020, which is incorporated herein by reference.

All statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

The invention claimed is:

1. A method for locally suppressing interference in radio frequency communications by satellites comprising:
   detecting, by a satellite, an interference signal from an adversarial source;
   in response to detecting the interference signal, generating, by the satellite, a null signal to suppress the interference signal by:
      executing adaptive beamforming to mitigate against morphological adjustments in the interference signal;
      determining an adaptive weight vector (AWV) by maximizing a recast signal-to-interference-plus-noise (SINR) criterion subject to a similarity constraint, wherein maximizing the recast SINR criterion is transformed into a convex optimization problem solved by a Quadratically Constrained Quadratic Programming (QCQP) step-down algorithm;

determining, via Space-Time Adaptive Processing, a covariance interference matrix based on the AWV; and suppressing, by the satellite, the interference signal using the generated null signal.

2. The method of claim 1, wherein the transformation into the convex optimization problem is performed by a Semi-Definite Programming (SDP) solver implemented on a modified GNU Octave (M-GNU-O) platform.

3. The method of claim 2, wherein the M-GNU-O platform utilizes Compute Unified Device Architecture (CUDA) multi-threaded parallel computing accelerants to address the convex optimization problem.

4. The method of claim 2, wherein an NP-hardness for maximizing the recast SINR is reduced from non-deterministic polynomial-time hardness (NP-hard) to polynomial time using the M-GNU-O platform.

5. The method of claim 1, further comprising tuning the AWV via a decomposition-based evolutionary algorithm.

6. The method of claim 5, wherein the decomposition-based evolutionary algorithm is a steady state genetic algorithm (SSGA).

7. The method of claim 6, wherein the SSGA is supplemented by a specific Particle Swarm Optimization (PSO) approach for hyperparameter reduction.

8. The method of claim 1, wherein the interference signal is nonstationary.

9. The method of claim 1, wherein the satellite further comprises magnetorquers configured to provide attitude control, detumbling, and/or stabilization of the satellite.

10. The method of claim 1, wherein the satellite is a CubeSat.

11. A system for locally suppressing interference in radio frequency communications, comprising:
a satellite configured to
i) detect an interference signal from an adversarial source;
ii) in response to detecting the interference signal, generate, by the satellite, a null signal to suppress the interference signal by:
executing adaptive beamforming to mitigate against morphological adjustments in the interference signal;
determining an adaptive weight vector (AWV) by maximizing a recast signal-to-interference-plus-noise (SINR) criterion subject to a similarity constraint, wherein maximizing the recast SINR criterion is transformed into a convex optimization problem solved by a Quadratically Constrained Quadratic Programming (QCQP) step-down algorithm; and
determining, via Space-Time Adaptive Processing, a covariance interference matrix based on the AWV; and
iii) suppress, by the satellite, the interference signal using the generated null signal.

12. The system of claim 11, wherein the transformation into the convex optimization problem is performed by a Semi-Definite Programming (SDP) solver implemented on a modified GNU Octave (M-GNU-O) platform.

13. The system of claim 12, wherein the M-GNU-O platform utilizes Compute Unified Device Architecture (CUDA) multi-threaded parallel computing accelerants to address the convex optimization problem.

14. The system of claim 12, wherein an NP-hardness for maximizing the recast SINR is reduced from non-deterministic polynomial-time hardness (NP-hard) to polynomial time using the M-GNU-O platform.

15. The system of claim 11, wherein the satellite is further configured to tune the AWV via a decomposition-based evolutionary algorithm.

16. The system of claim 15, wherein the decomposition-based evolutionary algorithm is a steady state genetic algorithm (SSGA).

17. The system of claim 16, wherein the SSGA is supplemented by a specific Particle Swarm Optimization (PSO) approach for hyperparameter reduction.

18. The system of claim 11, wherein the interference signal is nonstationary.

19. The system of claim 11, wherein the satellite further comprises magnetorquers configured to provide attitude control, detumbling, and/or stabilization of the satellite.

20. The system of claim 11, wherein the satellite is a CubeSat.

* * * * *